United States Patent
Michihata et al.

(10) Patent No.: US 6,320,042 B1
(45) Date of Patent: Nov. 20, 2001

(54) POLARIZING PLATE PROTECTIVE CELLULOSE TRIACETATE FILM

(75) Inventors: Isamu Michihata; Masahito Takada; Kunio Shimizu; Koichi Nagayasu; Noriki Tachibana, all of Hino (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/515,409

(22) Filed: Feb. 29, 2000

(30) Foreign Application Priority Data

Mar. 3, 1999 (JP) .................................................. 11-055470

(51) Int. Cl.$^7$ ............................ C08L 1/12; C09D 101/12; B32B 23/20; G02F 1/1335
(52) U.S. Cl. .................. 536/69; 536/80; 106/168.01; 106/171.1; 428/1; 428/532; 349/96
(58) Field of Search ............................ 106/168.01, 171.1; 536/69, 80; 428/1, 532; 349/96

(56) References Cited

U.S. PATENT DOCUMENTS

| 5,434,707 | 7/1995 | Dalzell et al. . | |
|---|---|---|---|
| 5,705,632 | * 1/1998 | Shimoda et al. | 536/69 |
| 5,753,140 | 5/1998 | Shigemura . | |
| 5,962,677 | * 10/1999 | Murakami et al. | 536/69 |

FOREIGN PATENT DOCUMENTS 0 761 788 A1   3/1997   (EP) .

OTHER PUBLICATIONS

Patent Abstracts of Japan, vol. 015, No. 430, Oct. 31, 1991 of JP 03 177801 A, 1(Aug. 1991).

* cited by examiner

*Primary Examiner*—David Brunsman
(74) *Attorney, Agent, or Firm*—Frishauf, Holtz, Goodman, Langer & Chick, P.C.

(57) ABSTRACT

A cellulose triacetate film characterized in being comprised of cellulose triacetate which is prepared by employing cotton liter as the raw material, having a value of weight average molecular weight Mw/number average molecular weight Mn of 3.5 to 4.5, or being comprised of cellulose triacetate which is prepared by employing wood pulp as the raw material, having a value of weight average molecular weight Mw/number average molecular weight Mn of 4.0 to 5.0.

18 Claims, 1 Drawing Sheet

US 6,320,042 B1

POLARIZING PLATE PROTECTIVE CELLULOSE TRIACETATE FILM

FIELD OF THE INVENTION

The present invention relates to a protective film for a polarizing plate, which is employed for liquid crystal display and the like, and particularly to a cellulose triacetate film which is suitable for such a protective film.

BACKGROUND OF THE INVENTION

Cellulose triacetate exhibits less double refraction. Due to its appropriate double refraction, said cellulose triacetate has frequently been employed for production of a protective film which is used for the polarizing plate of liquid crystal displays.

Commonly, the polarizing plate has such a structure that a polarizing film comprised of a polyvinyl alcohol film and the like, in which iodine or dyes are absorbed and oriented, is laminated on both sides with transparent resin layers. Frequently employed as said transparent resin layer is a protective film comprised of cellulose triacetate film.

In recent years, development of liquid crystal displays, to achieve a large-sized image screen as well as high image quality, has increasingly been made to produce monitors which is used in lieu of the conventional CRT. In conjunction with this, requirements for a protective film for the polarizing plate for a liquid crystal display have become more stringent. Specifically, it is strongly desired to overcome problems with the surface quality as well as the optical isotropy caused by the surface roughness of the protective film. Further, it is or also desired to improve the machine adaptability of the film, specifically the cutting properties when during production, the film is cut into the desired shape. Still further, it is strongly demanded to minimize foreign particles which are called glittering point of foreign particles observed under the arrangement of polarizing plates at the right angle.

SUMMARY OF THE INVENTION

An object of the present invention is to solve the problem of fluctuation. Another object of the present invention is to improve the machine adaptability of said film, specifically the cutting properties of said film when during production, said film is cut into a desired shape. Still another object of the present invention is to minimize foreign particles which are called glittering point of foreign particles observed under the arrangement of polarizing plates at the right angle.

The present invention is described.

A protective film for a polarizing plate comprising cellulose ester film wherein the cellulose ester film comprises cellulose ester having a value of weight average molecular weight Mw/number average molecular weight Mn of 3.0 to 5.0.

1. A protective film for a polarizing plate comprising cellulose ester having a value of weight average molecular weight Mw/number average molecular weight Mn of 3.0 to 5.0.
2. The protective film wherein the cellulose ester is cellulose triacetate.
3. The protective film wherein the cellulose ester is prepared by employing cotton liter as the raw material and has a value of weight average molecular weight Mw/number average molecular weight Mn of 3.4 to 4.5.
4. The protective film wherein the cellulose ester is prepared by employing wood pulp as the raw material and has a value of weight average molecular weight Mw/number average molecular weight Mn of 3.5 to 5.0.
5. The protective film wherein the cellulose ester has a value of weight average molecular weight Mw/number average molecular weight Mn of 3.3 to 4.5.
6. The protective film wherein the cellulose ester has a degree of polymerization of 230 to 300.
7. The protective film wherein the cellulose triacetate is prepared by employing cotton linter as the raw material and has a degree of polymerization of 250 to 300.
8. The protective film wherein the cellulose triacetate is prepared by employing wood pulp as the raw material and has a degree of polymerization of 230 to 280.
9. The protective film wherein the content of Fe component in the protective film is not more than 1 ppm.
10. The protective film wherein the content of Ca component in the protective film is not more than 60 ppm.
11. The protective film wherein the content of Ca component in the protective film is not more than 30 ppm.
12. The protective film wherein the content of Mg component in the protective film is 15 to 70 ppm.
13. The protective film wherein the cellulose ester has a 6 percent viscosity of 100 to 250 cp.
14. The protective film wherein absolute retardation value in plane (Ro) of the protective film is not more than 30 nm.
15. The protective film wherein the cellulose ester is a cellulose triacetate having degree of acetylation from 59 percent to 62.5 percent.
16. The protective film wherein the protective film satisfies condition:

$$R_0 \leq 1/(-4.1 \times 10^{-4} Z^2 + b \times Z - 0.015)$$

wherein $R_0$ represents the retardation within the surface in nm, Z represents the axis dislocation angle in degree of the protective film for a polarizing plate, b is a value selected from a group consisting of 0.044, 0.06, 0.1, 0.2 and 0.3.

17. The protective film wherein number of glittering points having a diameter of at least 0.01 mm on the polarizing plates is not more than 100/cm$^2$, which is counted by that two polarizing plates are arranged in cross Nicol, and the protective film is placed between them and other surface of the polarizing plates are irradiated with light.
18. A polarizing plate comprising a first protective film, a polarizer and a second protective film wherein at least one of the first protective film and the second protective film comprises cellulose ester having a value of weight average molecular weight Mw/number average molecular weight Mn of 3.0 to 5.0.

DETAILED DESCRIPTION OF THE INVENTION

Figure 1:
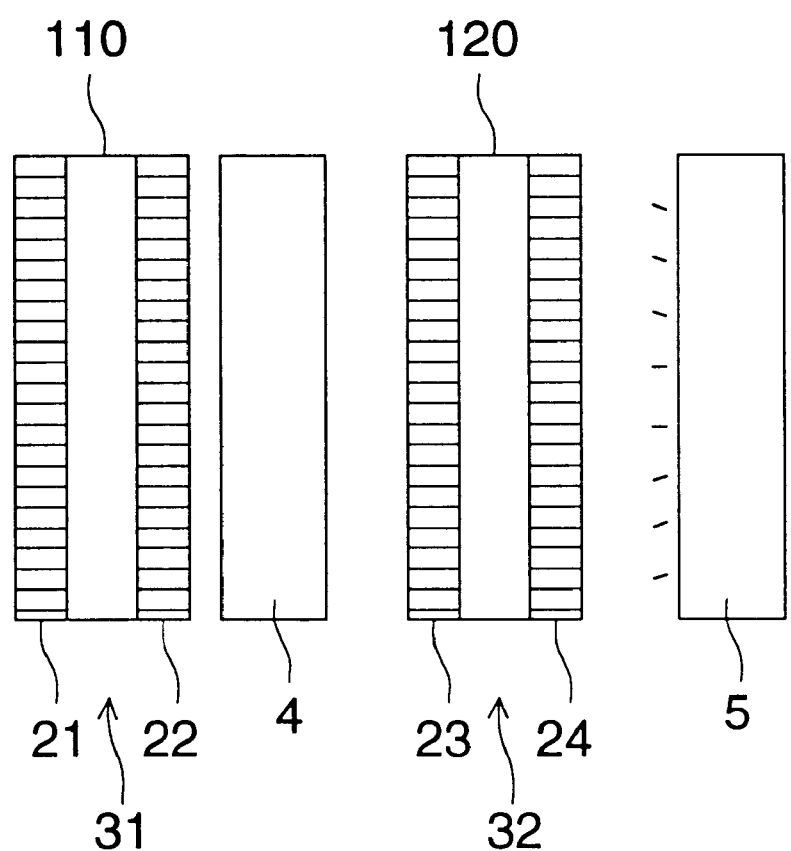
FIG. 1 is a schematic view of a liquid crystal display.

Preferred as cellulose ester films are cellulose triacetate films. Cited as other cellulose esters are cellulose acetate propionate (CAP), cellulose acetate butyrate (CAB), and the like. A cellulose triacetate film is formed in such a manner that generally, a solution termed a so-called dope, which is prepared by dissolving cellulose triacetate in a solvent, is cast onto an endless belt (casting band) which is entrained as a support or a drum which rotates as a support, employing a solution casting method. These are termed a so-called belt system and drum system. After casting, a part of the solvent in the cast film on the support is evaporated and the film solidifies. Said solidified film is peeled off employing a peeling roll and the like, and the residual solvent is evaporated in the drying section to form a triacetyl film.

The protective film for a polarizing plate is produced by casting a dope onto a support, peeling the cast dope from said support, and subsequently drying the peeled film. Said dope is comprised of cellulose esters having a ratio of weight average molecular weight Mw/number average molecular weight Wn of 3.0 to 5.0, as well as a viscosity at 6 percent solid portion concentration (viscosity of solution which is composed of 6 persent of cellulose ester dissolved in, for example, methylchloride) of 100 to 250 cp. Particularly, preferred is the polymerization degree of the cellulose ester being 230 to 300. During peeling, the peeling tension is preferably not more than 250 N/m, and more preferably, 200 N/m, and the conveyance tension is preferably 100 to 300 N/m, and more preferably 130 to 200 N/m, and tenter is preferably 1 to 1.1 times. In more preferable embodiment, conveyance tension is kept 100 to 300 N/m in the range from peeling to completion of drying wherein the residual solvent amount being 2% or less.

Regarding the tenter, the residual solvent is not more than 100 percent, and the drawing ratio in the width direction is preferably not more than 10 percent, and is more preferably not more than 5 percent when it is dried while it is subjected to width directional tension. When the drawing ratio in the width direction satisfies such condition surface quality can be improved in addition to keeping optical isotropic property. Said drawing ratio is preferably achieved at the residual solvent ratio of not more than 50 percent, and more preferably at a ratio of not more than 20 percent. Further, said conveyance tension is preferably achieved at the residual solvent ratio of not more than 20 percent, and more preferably during whole drying procedure after peeling. Further, the residual solvent as described herein means the ratio of solvents which remain in the film as represented by the formula mentioned below. When the amount of the residual solvent in a film is the same as the film components, the amount of the residual solvents is denoted as 100 percent.

Amount of residual solvent=(amount of residual volatile parts/mass of film after heat process)×100%

The amount of residual volatile parts is a difference of mass of film before heat processing from after heating in case the film is heat processed at 115° C., for one hour.

Furthermore, cellulose triacetate, employed as the raw material, is produced by acetylating cellulose. The degree of acetylation varies depending on the reaction time, and the molecular weight distribution also varies due to effects of decomposed materials. Further, the content of decomposed materials as well as impurities varies. The cellulose employed as the raw material is derived from cotton and wood pulp. These are different in the molecular weight distribution. Accordingly, it is known that such difference results in a somewhat different quality of the resultant cellulose triacetate.

As the results of diligent investigation, the present inventors have discovered that the object of the present invention can be achieved employing the aforementioned cellulose triacetate film.

He surface quality of the invention means that flatness of the surface of the cellulose ester film. The Fine streaks are caused by dice defect employed in casting film forming or shrinkage width direction during conveying procedure whereby surface quality is degraded. The surface quality is reflected to the flatness of the protective film for the polarizing plate and the polarizing plate itself, and further to the flatness of the surface of a liquid crystal display unit formed by employing the polarizing plate. When the surface quality is not satisfactory such problems arises that characters displayed on the liquid crystal display unit are not readable comfortably. The surface quality can be detected by eye viewing of distortion of reflected image of, for eample, fluorescent lamp.

By employing the cellulose esters of the present invention, during production, the dope smoothly flows. Thus, it is possible to smoothen the film surface and to decrease screen fluctuation when the resulting protective film for a polarizing plate is employed in a liquid crystal display unit.

The glittering point of foreign particles as described in the present invention means a light transmitting spot, which looks white, when observed in the following manner. Two polarizing plates are arranged in the right angle (cross Nicol) and a cellulose triacetate film is placed between them. The surface of the fabricated polarizing plates are then observed employing a microscope while the other surface is irradiated with light. The presence of said spots in the display causes problems. Therefore, the fewer spots, the better the performance of the liquid crystal film. It is understood that said spots are caused due to the fact that the refractive index of cellulose triacetate varies at the spot where the foreign particles are present and thus the formation of the polarizing state is hindered. Further, it is understood that minute foreign particles are included during the casting process of the cellulose triacetate film. Since these foreign particles are considered as insoluble material, it is assumed that one of the causes relates to the residual cellulose which has not been acetylated during the acetylation process. In order to increase the ratio of acetylation, it is necessary to extend the acetylation time. However, as the reaction time is excessively extended, decomposition simultaneously occurs, and the breakage of the polymer chain, the decomposition of the acetyl group, and the like, occur. As a result, from the viewpoint of the formation of insoluble materials due to a minute amount of metals as described below, preferable results are not obtained. Accordingly, in order to increase the degree of acetylation as well as to hinder to some extent the decomposition, it is necessary to specify the reaction time within a certain range. However, it is inappropriate to specify the reaction time because the reaction time varies largely depending on the reaction unit, facilities and other conditions due to various types of reaction conditions.

As the decomposition of polymer proceeds, the molecular weight distribution broadens. Thus in the case of cellulose triacetate, it is also possible to specify the decomposition ratio employing the commonly used value of weight average molecular weight Mw/number average molecular weight Wn. Namely, as one of the reaction progressing indexes during the acetylation process of cellulose triacetate, the value of weight average molecular weight Mw/nu rer average molecular weight Wn is preferably employed so that the decomposition does not proceed excessively and the acetylation is carried out over a sufficient period of time. The value of Mw/Mn in the present invention is between 3.0 and 5.0. Further, in the present invention, the protective film for a polarizing plate may comprise cellulose esters having a value of Mw/Mn of 3.0 to 5.0 as the raw material. However, the value of Mw/Mn of all the cellulose esters incorporated into the protective film for the polarizing plate is preferably between 3.0 and 5.0. In other words, the value of Mw/Mn of cellulose esters (being preferably cellulose triacetate), which can be detected from the protective film for the polarizing plate, is more preferably between 3.0 and 5.0, is further preferably between 3.3 and 4.5, and is most preferably between 3.5 and 4.5. The optimum values are somewhat different between cotton linter and wood pulp cellulose triacetates due to differences in molecular weight distribution as well as properties of the raw materials. Further, there are needle-leaf tree pulp and broadleaf tree pulp, and the former is more preferred. When cotton linter is employed, the value of weight average molecular weight Mw/number average molecular weight Wn is preferably in the range of 3.5 to 4.5, while when wood pulp is employed, the value of weight average molecular weight Mw/number average molecular weight Wn is preferably between 4.0 and 5.0. The researchers of the present invention have discovered that the aforementioned glittering point of foreign particles are largely minimized employing the cellulose triacetate having such values.

The cellulose triacetate of the present invention may exhibit said effects in accordance with the content ratio incorporated into the cellulose triacetate film. However, the content ratio in the cellulose triacetate film is preferably at least 30 percent, is more preferably at least 50 percent, and is further preferably 70 percent, most preferably 90 percent, and particularly preferably 100 percent.

Properties of cellulose triacetate are affected by the minute amount of metal components incorporated in the cellulose triacetate. It is understood that water employed in the production process is involved in the variation in properties. Thus the content of components, which may work as nuclei to form water insoluble materials, is preferably further minimized, and the content of metal ions, which forms salts, being unnecessary substances, upon reacting with polymer decomposition products which may comprise organic acidic groups such as iron, calcium, magnesium, and the like, is preferably minimal. However, in practical terms, interaction between various components and other factors are somewhat involved. Therefore it is difficult to conclude that simply, the less the content of said components, the better the results are obtained. However, when the amount is excessive, problems do occur.

The content of iron (Fe) components is preferably not more than 1 ppm. When either cotton linter pulp or wood pulp is employed, the content is preferably minimal in the same manner. It is impossible to completely eliminate said components due to the production itself. The content is preferably in the range of 0.01 to 1 ppm, which is a lower limit in the production.

Underground water, river water, and the like contain a relatively large amount of calcium (Ca) components. Water containing a large amount of such components is denoted as hard water, which is not suitable as potable water. Such components tend to form coordination compounds, that is, complexes with acidic components such as carboxylic acid, sulfonic acid, and the like. Thus, scum (resulting in insoluble precipitates and turbidity) derived from many unnecessary calcium components is formed.

The content of calcium (Ca) components is preferably 60 ppm and in case that the raw material of the cellulose acetate is cotton linter the content of calcium (Ca) components in cellulose acetate is preferably not more than 30 ppm, while the content of the same in the cellulose triacetate employing wood pulp as the raw material is preferably not more than 60 ppm, which is somewhat greater. In practice, the less the content, the more it is preferred. However, it is difficult to eliminate them due to the production itself. The lower limit is about 10 ppm. Accordingly, the content of said components in the cotton linter is preferably between 10 and 30 ppm, and the same in the wood pulp is preferably between 10 and 60 ppm, and is more preferably between 30 and 60 ppm. The optimal value, when cotton linter is employed, is different from that when the wood pulp is employed.

Underground water, river water, and the like also contain a relatively large amount of magnesium (Mg) components, also as the calcium components. They are also undesired materials. When the content of these magnesium components is excessively large, insoluble materials are formed. Accordingly, an excessive content of them is not preferred. However, when the content is too small, good properties are not obtained. The optimal range is between 15 and 70 ppm, in particular between 15 and 20 ppm for the cotton linter, and it is between 30 and 70 ppm for the wood pulp.

Further, the degree of polymerization (being the viscosity average polymerization degree described below) of the cotton linter is preferably between 250 and 300, while the same of the wood pulp is preferably in the range of 230 to 280. An excessively large degree of polymerization adversely affects the formation of the glittering point of foreign particles due to the increase in insoluble components. On the other hand, an excessively small degree of polymerization results in a film having insufficient physical properties, which does not meet requirements for a protective film.

In the same way, 6 percent viscosity (also described below) is preferably in the range of 100 to 250 cp.

When one of these requirements is satisfied, desired effects are exhibited. However, when cellulose triacetate, which simultaneously satisfies at least two of them, is employed, effects are more exhibited. The major requirement of the present invention is to employ cellulose triacetate having the aforementioned range of weight average molecular weight Mw/number average molecular weight Wn. In addition, when the cellulose triacetate which has a content of iron (Fe) components of not more than 1 ppm, a content of calcium (Ca), magnesium (Mg), and the like of the aforementioned values, a degree of polymerization and 6 percent viscosity of the aforementioned range is employed, the largest effects are exhibited. It is most preferred to satisfy all these requirements.

The average molecular weight as well as the molecular weight distribution can be measured by high-speed liquid chromatography. By employing this technique, the number average molecular weight as well as the weight average molecular weight is calculated, and the ratio can also be calculated.

The measurement conditions were as follows:

| | |
|---|---|
| Solvent: | Methylene chloride |
| Column: | Shodex K806, K805 and K803G (manufactured by Showa Denko K.K., Three columns are employed by connected.) |
| Column temperature: | 25° C. |
| Sample concentration: | 0.1 w/volume percent |
| Detector: | RI Model 504 (manufactured by GL Science Co., Ltd.) |
| Pump: | L6000 (manufactured by Hitachi, Ltd.) |
| Flow rate: | 1 ml/minute |
| Injected sample amount: | 300 μl |

| Calibration curve: | Calibration curve by 13 samples of standard polystylene TSK Standard Polystulene (manufactured by Toso Co., Ltd.) having molecular weight by weight of 1000000 to 500 was employed. It is preferred to make sampling about same interval. |
|---|---|

The degree of polymerization as described in the present invention means viscosity average degree of polymerization. The viscosity average degree of polymerization (DP) was measured as follows:

Absolutely dried cellulose acetate in an amount of 0.2 g was accurately measured, and was dissolved in 100 ml of a mixed solvent solution comprising methylene chloride:ethanol=9:1 (ratio by weight). The vertical flow time, in seconds, of the resulting solution was measured at 25° C. employing an Ostwald viscosimeter, and the degree of polymerization was obtained employing the formula shown below:

$$\eta_{ref}=T/T_0$$

$$[\eta]=(1n\eta_{ref})/C$$

$$DP=[\eta]/k_m$$

wherein T represent the vertical flow time, in seconds, of a measured sample, $T_0$ represents the vertical flow time, in seconds, of the solvent alone, C represents the concentration (g/liter), and Km is $6 \times 10^{-4}$.

The 6 percent viscosity of cellulose triacetate was measured as follows:

Placed in an Erlenmeyer flask were 61.67 g of a mixed solution (methylene chloride:methanol=91:9), to which 3.00 g of a dried sample was added. After tightly sealing the flask, the resultant mixture was shaken for about 1.5 hours employing a horizontal shaker, thereafter, was further shaken for about additional one hour employing a rotary shaker to completely dissolve said sample. The resultant 6 weight percent solution was transferred up to the specified marked line of an Ostwald viscosimeter, and was stored at 25±1° C. for about 15 minutes in a thermostat in order to adjust the solution temperature. The vertical flowing time between marked lines was measured.

The 6 percent viscosity is calculated employing the formula shown below:

6% viscosity (in cps)=vertical flow time (in seconds)×viscosimeter coefficient

The viscosimeter coefficient is obtained by measuring the vertical flow time, in seconds, in the same manner, as described above, employing a standard viscosimeter calibration solution.

Trace metal components of the present invention, that is, the content of metal components such as calcium (Ca) content, magnesium (Mg) content, and the like were quantitatively analyzed as follows. Absolutely dried cellulose triacetate is subjected to pretreatment using alkali fusion employing a microdigest wet type decomposition apparatus (of sulfuric and nitric acid decomposition). Thereafter, the quantitative analysis is carried out employing ICP-AES (being an induced coupling plasma quantometer).

In order to prepare said cellulose triacetate film, a dope is prepared by dissolving cellulose triacetate in solvents. Suitably employed as such solvents are chlorides of lower aliphatic hydrocarbons, such as methylene chloride, and the like, lower aliphatic alcohols such as methanol, ethanol, n-propyl alcohol, n-butyl alcohol, and the like, and cyclohexanone, dioxane, toluene, ethyl acetate, methyl cellosolve, and the like. Methylene chloride is a good solvent: for cellulose triacetate. However, by employing poor solvents such as the aforementioned lower aliphatic alcohols, and the like, together with good solvents, it is possible to enhance the solid formation, occurring when the dope cast on a support is cooled.

Further, suitably added as components incorporated into said cellulose triacetate film may be additives such as plasticizers, peeling promoting agents, UV absorbers, and the like. Employed as plasticizers may be phosphoric acid ester based plasticizers such as triphenyl phosphate, trimethyl phosphate, and the like, phthalic acid ester based plasticizers such as dimethyl phthalate, diethyl phthalate, and the like, glycolic acid ester based plasticizers such as methylphthalylethyl glycolate, ethylphthalylethyl glycolate, and the like, or polymer plasticizers, and the like. Peeling promoting agents are those which aid in peeling the film, obtained by the solidification of a dope, from the support. Further, suitably employed as UV absorbers are benzophenone based UV absorbers, benztriazole based UV absorbers, or UV absorbing polymers, and the like. These are preferably added into said dope.

Further, cellulose triacetate as described herein means that of 3 hydroxyl groups per cellulose unit, approximately 3 hydroxyl groups are substituted with an acetyl group. Cellulose triacetate is commonly employed, which has a degree of acetylation from 62.5 percent, that is, all 3 hydroxyl groups are substituted, to 56 percent.

The cellulose triacetate film, which comprises cellulose triacetate having a degree of acetylation of 59 to 62.5 percent in an amount of at least 70 percent by weight, is particularly preferred. The degree of acetylation is more preferably between 60 and 62.5 percent, and further is more preferably between 61 and 62.5 percent.

Further, the protective film for polarizing plates of the present invention preferably has a retardation value within the surface of not more than 30 nm, and said retardation value is more preferably not more than 10 nm, and is further preferably not more than 5 nm. The absolute retardation value in plate (Ro) is obtained by the formula;

$$Ro=|Nx-Ny| \times d$$

Nx: Maximum index of refraction in a direction parallel to film plane
Ny: Index of refraction in a direction paralell to the film plane and vertical to Nx direction
d: Thickness of the film
Further, said retardation value can be measured employing a simultaneous double refractometer, such as, for example, KOBRA-21 ADH, manufactured by Oji Keisokukiki Co. It is obtained by indeces of refraction Nx, Ny and Nz measured by three dimensional indeces at 23° C., 55% RH.

Still further, it is preferable that the protective film for polarizing plates of the present invention satisfies the conditional expression shown below:

$$R_0 \leq 1/(-4.1 \times 10^{-4} Z^2 + b \times Z - 0.015)$$

wherein $R_0$ represents the absolute retardation value in plane in nm, Z represents the axis dislocation angle in degree of the protective film for a polarizing plate.

b is preferably a value of at least 0.038, specifically it is preferably 0.038, is more preferably 0.044, is more preferably 0.06, is further preferably 0.1, still further preferably 0.2, and still further more preferably 0.3.

Further, the axis dislocation angle in the protective film for the polarizing plate as described herein means an angle between the mechanical conveyance direction of the protective film in step of making protective film for the polarizing plate and Nx direction. Alternatively, in the case of the polarizing plate, the angle may mean that between the orientation direction of polarizers and the Nx direction.

When said conditional expression is satisfied, it is possible to obtain effects in which the optical isotropy is improved and it is further possible to carry out uniform display, and also to improve the contrast.

Further, the retardation value (Rt) in the film thickness direction of the protective film for the polarizing plate is preferably between 25 and 150 nm, and is more preferably between 50 and 100 nm.

The retardation value (Rt) can be obtained by the formula;

$$Rt=((Nx+Ny)/2-Nz)\times d$$

Nz: Index of refraction in direction of vertical to film plane

Further, two polarizing plates are arranged in cross Nicol, and the aforementioned protective film for the polarizing plate is placed between them. The number of glittering points, having a diameter of at least 0.01 mm on the polarizing plates, is counted while the other surface of the polarizing plates are irradiated with light. The number of glittering points is preferably not more than $200/cm^2$, is more preferably not more than $100/cm^2$, and is more preferably not more than $50/cm^2$, and is more preferably not more than $30/cm^2$, and is most preferably not more than $10/cm^2$.

Further, the protective film for polarizing plates of the present invention preferably transmits visible light of at least 50 percent, more preferably at least 70 percent, and most preferably at least 80 percent.

The protective film for polarizing plates of the present invention preferably has a total content of mannose and xylose of not more than 10 mole percent, and more preferably not more than 6 mole percent. By using such values, during production, the film is readily peeled. Thus, it is possible to smoothen the film surface and to further minimize the generation of fluctuation.

Further, the thickness of the protective film for the polarizing plates is preferably between 20 and 250 μm, is more preferably between 20 and 100 μm, and is most preferably between 20 and 60 μm.

The protective film for the polarizing plates may contain fine particles as a matting agent. Example of the fine particles as the matting agent includes an inorganic material such as silicon dioxide, titan dioxide, aluminum oxide, zirconium oxide, talc, clay, burned kaolin, aluminum silicate. Preferable example of the fine particles is that containing silica which reduces turbidity, and particularly preferable example is silicon dioxide. The silicon dioxides can be obtained in the market with trade name of Aerosil R972, R972V, R974, R812, 200, 200V, 300, R202, OX50 and TT600 (those are trade name of Nippon Aerosil). Example of organic compounds includes silicone resin, fluoride resin and acryl resin. The preferable one is silicone resin, particularly having three dimensional net structure. They are obtained in a market with the trade name of Tospearl 103, 105, 108, 120, 145, 3120 and 240, each of which is trade name of Toshiba Silicone Co., Ltd. Among those Aerosil 200V and Aerosil R972 are preferably employed which reduce friction coefficient while keeping turbidity of optical film low.

Matting agent can be contained preferably 0.005 to 0.5 weight %, more preferably 0.01 to 0.3 weight % and particularly preferable 0.05 to 0.1 weight % to the protective film for the polarizing plates.

The protective film for the polarizing plates may contain plasticizer. The amount of the plasticizer is 0.2 to 10.0 g, more preferably 0.5 to 5.0 g and particularly preferably 0.8 to 2.0 g per 1 $m^2$ of the protective film.

Next, the polarizing plates of the present invention will be described. The polarizing plates are constituted in such a manner that a first protective film for a polarizing plate and a second protective film for a polarizing plate sandwiches a polarizer.

Further, the first protective film for a polarizing plate or the second protective film for a polarizing plate (preferably both protective films) is comprised of a cellulose ester film, and said cellulose ester film is comprised of a cellulose ester having a value of weight average molecular weight Mw/number average molecular weight Mn of 3.0 to 5.0.

Further, preferred as the polarizer are those obtained in such a manner that iodine is adsorbed onto a film such as polyvinyl alcohol and the like, and the resulting film is stretched.

Next, one example of the liquid crystal display unit of so the present invention will be described with reference to FIG. 1. The liquid crystal display unit of the present invention comprises first polarizing plate 31, liquid crystal cell 4, and second polarizing plate 32, arranged in the interior of the first polarizing plate 31 and the liquid crystal cell 4. As a light source, backlight 5 may be installed in the deeper interior of the second polarizing plate 32. The first polarizing plate 31 comprises a first protective film 21 provided on the surface of first polarizer 110 on the side which faces neither the first polarizer 110 nor the liquid cell 4, and second protective film 22 provided on the surface of said first polarizer 110 on the side which faces the first protective film 21 as well as the liquid crystal cell 4. Further the second polarizing plate 32 comprises third protective film 23 provided on the surface of second polarizer 120 on the side which faces the second polarizer 120 as well as the liquid cell 4 and fourth protective film 24 provided on the surface of the second polarizer 120 on the side which faces neither the third protective film 23 nor the liquid cell 4. Further, at least one of the first, second, third and fourth protective film (preferably the second, third protective film, more preferably all protective films) comprises a cellulose ester film comprised of cellulose esters having a value of weight average molecular weight Mw/number average molecular weight Mn of 3.0 to 5.0.

Further, the protective film for polarizing plates of the present invention, a polarizing plate, and a liquid crystal display unit is preferably applied to a TFT liquid crystal display unit, since marked effects are exhibited with such unit.

The other referable embodiments of the invention are described.

A cellulose triacetate film comprising cellulose triacetate which is prepared by employing cotton linter as the raw material, and has a value of weight average molecular weight Mw/number average molecular weight Mn of 3.5 to 4.5.

A cellulose triacetate film characterized in being comprised of cellulose triacetate which is prepared by employing wood pulp as the raw material, and has a value of weight average molecular weight Mw/number average molecular weight Mn of 4.0 to 5.0.

A cellulose triacetate film characterized in being comprised of cellulose triacetate in which the content of Fe component is not more than 1 ppm.

A cellulose triacetate film characterized in being comprised of cellulose triacetate which is prepared by employing cotton liter as the raw material, and being comprised of cellulose triacetate having a content of the Ca component of not more than 30 ppm.

A cellulose triacetate film characterized in being comprised of cellulose triacetate which is prepared by employing wood pulp as the raw material, and being comprised of cellulose triacetate having a content of the Ca component between 30 and 60 ppm.

A cellulose triacetate film characterized in being comprised of cellulose triacetate which is prepared by employing cotton linter as the raw material, and being comprised of cellulose triacetate having a content of the Mg component of 15 to 20 ppm.

A cellulose triacetate film characterized in being comprised of cellulose triacetate which is prepared by employing wood pulp as the raw material, and being comprised of cellulose triacetate having a content of the Mg component of 30 to 70 ppm.

A cellulose triacetate film characterized in being comprised of cellulose triacetate which is prepared by employing cotton linter as the raw material, and being comprised of cellulose triacetate having a degree of polymerization of 250 to 300.

A cellulose triacetate film characterized in being comprised of cellulose triacetate which is prepared by employing wood pulp as the raw material, and being comprised of cellulose triacetate having a degree of polymerization of 230 to 280.

A cellulose triacetate film characterized in being comprised of cellulose triacetate having a 6 percent viscosity of 100 to 250 cp.

The present invention will now be described with specific reference to examples below.

EXAMPLES

Cellulose triacetate was prepared as described below.

Preparation of Cellulose Triacetate

TAC 1

As a cellulose raw material, 100 weight parts of cotton linter was shattered, and 40 weight parts of acetic acid were added. The resultant mixture was subjected to pre-treatment activation at 40° C. for 20 minutes. Thereafter, 8 weight parts of sulfuric acid, 260 weight parts of acetic anhydride, and 350 weight parts of acetic acid were added, and the resulting mixture was subjected to esterification ripening at 36° C. for 150 minutes. After neutralization by adding 11 weight parts of 24% aqueous solution of magnesium acetate, it was subjected to saponification ripening at 63° C. for 30 minutes. Thus, cellulose triacetate was obtained. An acetic acid solution (acetic acid:water=1:1 by weight) in an amount of 10 times by weight was added and the resulting mixture was stirred at room temperature for 120 minutes, was then filtered and dried. Thus, purified Cellulose triacetate TAC 1 was obtained.

TAC 2

As a cellulose raw material, 100 weight parts of cotton linter was shattered, and 40 weight parts of acetic acid were added. The resultant mixture was subjected to pre-treatment activation at 40° C. for 20 minutes. Thereafter, 8 weight parts of sulfuric acid, 260 parts of acetic anhydride, and 350 weight parts of acetic acid were added, and the resulting mixture was subjected to esterification at 36° C. for 240 minutes. Thus, cellulose triacetate was obtained. An acetic acid solution (acetic acid:water=1:1 by weight) in an amount of 20 times by weight was added and the resulting mixture was stirred at room temperature for 120 minutes, was then filtered and dried. Thus, purified Cellulose triacetate TAC 2 was obtained.

TAC 3

Cellulose triacetate TAC 3 was obtained in the same manner as TAC 2, except that the cellulose raw material in TAC 2 was replaced with needle-leaf tree wood pulp.

Sample 1 was prepared as described below.

| | |
|---|---|
| Cellulose triacetate TAC 2 | 100 weight parts |
| 2-(2'Hyroxy-3', 5'-di-t-butylphenyl) benzotriazole | 2 weight parts |
| Ethylphthalylethyl glycolate | 5 weight parts |
| Ethylene chloride | 475 weight parts |
| Ethanol | 50 weight parts |

The compounds described above were placed in a tightly sealed vessel, heated, and completely dissolved while stirring. After filtering the resultant dope, it was maintained at 33° C., and was then cast onto a 1,500 mm wide stainless steel band support. After evaporating the solvents until the cast dope could be peeled off from the stainless steel band support, peeling was carried out. A peeled cellulose triacetate film was silt into a width of 1,100 mm. Thus an 80 μm thick cellulose triacetate film Sample 1 was obtained.

Samples 2 through 6 were prepared by employing various types of prepared cellulose triacetates, as described above. Table 1 shows the amount of components and the measurement results of various types of cellulose triacetate, which are associated with the present invention.

TABLE 1

| | Unit | TAC1 | TAC2 | TAC3 |
|---|---|---|---|---|
| 6% Viscosity | cps | 335 | 222 | 209 |
| Degree of Polymerization | — | 306 | 291 | 269 |
| Ca | ppm | 48.7 | 14.7 | 58.7 |
| Mg | ppm | 5.3 | 17.3 | 50 |
| Fe | ppm | 7.9 | 0.6 | 0.6 |
| Molecular Weight Mn | $\times 10^4$ | 9.2 | 6.9 | 6 |
| Molecular Weight Mw | $\times 10$ | 24 | 26.8 | 27.4 |
| Mw/Mn | | 2.7 | 3.9 | 4.6 |

Sample 7 was prepared in the following way.

Silicon Oxide Dispersion

| | |
|---|---|
| Aerosil 200V (Manufactured by Nippon Aerosil Co., Ltd.), having primary average diameter of 12 nm, and apparent density of 100 g/l. | 10 parts by weight |
| Ethanol | 90 parts by weight |

Those were mixed by dissolver for 30 minutes, then were dispersed by employing Mantongaurin. The turbidity of the dispersion was 93 ppm.

Preparation of Additive Composition

| | |
|---|---|
| UV ray absorbant Tinuvin-326 (manufactured by Ciba Specialty Chemical Co.) | 4 weight parts |
| UV ray absorbant Tinuvin-109 (manufactured by Ciba Specialty Chemical Co.) | 6 weight parts |
| UV ray absorbant Tinuvin-171 (manufactured by Ciba Specialty Chemical Co.) | 6 weight parts |
| Triacetyl celulose TAC2 | 4 weight parts |
| Methylenechroride | 100 weight parts |

Those listed above were poured into sealed vessel, and dissolved completely by heating and stirring and then filtered. Silicon oxide dispersion 10 weight parts was added to this while stirring, after that stirring was continued for 30 minutes, then was filtered and further Additive composition A was added.

Preparation of Dope Composition

| | |
|---|---|
| Triacetyl cellulose TAC2 | 100 weight parts |
| Ethyl phthalylethylglicolate | 2 weight parts |
| Triphenl phosphate | 9 weight parts |
| Methylene chloride | 475 weight parts |
| Ethanol | 50 weight parts |

Those listed above were poured into sealed vessel, and dissolved completely by heating and stirring and then filtered to obtain dope composition. The Additive composition A 1.5 weight parts was added to 100 weight parts of the dope composition, and they were mixed sufficiently by means of inline mixer ((Tore static inline mixer Hi-Mixer, SWJ) and then filtered. It was cast uniformely on stainless steel belt support at 33° C. with width of 1500 mm by employing belt casting apparatus. Solvent was removed so as to the residual solvent became 100% on the stainless steel belt, then, it was peeled off at 150 N(13 kgf)/m from the stainless steel belt. The peeled off cellulose triacetate film was dried so as to contain residual solvent of 20% whereby the film was drawn in wide (TD) direction by pin tenter so as to draw ratio of 1.05. After that the film was conveyed in the drying zone with conveying tension of 150 N/m among plurality number of rolls to make complete drying. Thus cellulose triacetate film sample 7 was obtained. The residual solvent was 0.2% and the film thickness was 80 μm when the drying was complete.

Sample 8 was prepared in the similar way except that the dried thickness was modified to 40 μm.

Namely, Sample 2 was prepared in the same manner as Sample 1, except that cellulose triacetate TAC 2 of Sample 1 was replaced with TAC 3.

Samples 2 through 6 were prepared in the same manner as Sample 1, except that cellulose triacetate TAC 2 of Sample 1 was replaced with other types of cellulose triacetate, as shown in Table 2.

Cellulose triacetate films, prepared as described above, were subjected to inspection for glittering points, employing the following method.

Measurement Method of Glittering Points

Two polarizing plates were arranged at the right angle (cross Nicol), and the aforementioned sample was placed between them. Then, the number of glittering points in 25 mm$^2$ area of sample (foreign particles which look white while transmitting light) was recorded at 100 places, employing a microscope, and the average was obtained. The microscope was used under conditions of a magnification factor of 30 and a back lighting unit. The fewer the number of glittering points of foreign particles, the better the properties of the material are.

Tractability of the samples was tested in the following manner.

Test of Tractability

Cellulose ester film samples cut into 20 cm×20 cm was fold into size of 20 cm×2.5 cm, and it was cut by press cutter DN-3 (manufactured by KOKUYO CO., LTD) into 10 cm×2.5 cm pieces. The cross cut surface was ranked in the level mentioned below. Rank C or higher are practically available.

A: Cross section surface is transparent and there is no rough touch feeling.
B: Cross section surface is transparent and there is slightly rough touch feeling.
C: Cross section surface is white opaque and there is rough touch feeling.
D: Cross section surface is white opaque and looks as having powder, and there is rough touch feeling extremely.

The surface quality of each samples were tested in the following manner.

Test of Surface Quality

Each sample was cut into wide of 90 cm and length of 100 cm, roughness of reflection on the surface of the samples was evaluated by eye viewing wherein the sample were illuminated at angle of 45° by five fluorescent lamps provided 1.5 meter over the sample. and The surface quality was ranked in the level mentioned below. Rank C or higher are practically available.

A: Five fluorescent lamps were all observed straight.
B: The fluorescent lamps were observed slightly deformed.
C: The fluorescent lamps were observed deformed as a whole.
D: The fluorescent lamps were observed waved widely.
E: The fluorescent lamps were observed waved narrowly in addition widely.

TABLE 2

|  | Type | Weight (in weight parts) | Type | Weight (in weight parts) | Number of glittering points | Surface quality | Tract-ability | Ro (nm) | Z (degree) |
|---|---|---|---|---|---|---|---|---|---|
| Sample 1 | TAC2 | 100 |  |  | 2.3 | B | A | 1.3 | 3.0 |
| Sample 2 | TAC3 | 100 |  |  | 3.7 | B | A | 1.4 | 2.9 |
| Sample 3 | TAC1 | 100 |  |  | 164.1 | E | D | 2.2 | 6.0 |
| Sample 4 | TAC2 | 70 | TAC3 | 30 | 2.7 | B | A | 1.5 | 3.4 |
| Sample 5 | TAC1 | 30 | TAC3 | 70 | 19.2 | C | B | 1.6 | 4.8 |
| Sample 6 | TAC1 | 50 | TAC3 | 50 | 42.1 | C | C | 1.7 | 5.2 |
| Sample 7 | TAC2 | 100 |  |  | 2.5 | A | A | 0.3 | 10.2 |
| Sample 8 | TAC2 | 100 |  |  | 1.3 | A | A | 0.3 | 6.1 |

As shown above, it is found that the number of glittering points of the cellulose triacetate films of the present invention markedly decreases.

According to the present invention, it is possible to obtain an excellent protective film for a polarizing plate, which minimizes fluctuation when applied to a liquid crystal display unit, and also minimizes glittering points of foreign particles. Further, it is possible to improve the machine adaptability of said film, specifically during production, the cutting properties to cut said film in a desired shape. Subsequently, it is possible to obtain excellent polarizing plates as well as excellent liquid crystal display units.

Disclosed embodiment can be varied by a skilled person without departing from the spirit and scope of the invention.

What is claimed is:

1. A protective film for a polarizing plate comprising cellulose ester having a value of weight average molecular weight Mw/number average molecular weight Mn of 3.0 to 5.0.

2. The protective film of claim 1 wherein the cellulose ester is cellulose triacetate.

3. The protective film of claim 1 wherein the cellulose ester is prepared by employing cotton liter as the raw material and has a value of weight average molecular weight Mw/number average molecular weight Mn of 3.5 to 4.5.

4. The protective film of claim 1 wherein the cellulose ester is prepared by employing wood pulp as the raw material and has a value of weight average molecular weight Mw/number average molecular weight Mn of 4.0 to 5.0.

5. The protective film of claim 1 wherein the cellulose ester has a value of weight average molecular weight Mw/number average molecular weight Mn of 3.3 to 4.5.

6. The protective film of claim 1 wherein the cellulose ester has a degree of polymerization of 230 to 300.

7. The protective film of claim 6 wherein the cellulose triacetate is prepared by employing cotton linter as the raw material and has a degree of polymerization of 250 to 300.

8. The protective film of claim 6 wherein the cellulose triacetate is prepared by employing wood pulp as the raw material and has a degree of polymerization of 230 to 280.

9. The protective film of claim 1 wherein the content of Fe component in the protective film is not more than 1 ppm.

10. The protective film of claim 1 wherein the content of Ca component in the protective film is not more than 60 ppm.

11. The protective film of claim 1 wherein the content of Ca component in the protective film is not more than 30 ppm.

12. The protective film of claim 1 wherein the content of Mg component in the protective film is 15 to 70 ppm.

13. The protective film of claim 1 wherein the cellulose ester has a 6 percent viscosity of 100 to 250 cp.

14. The protective film of claim 1 wherein absolute retardation value in plane (Ro) of the protective film is not more than 30 nm.

15. The protective film of claim 1 wherein the cellulose ester is a cellulose triacetate having degree of average acetylation from 59 percent to 62.5 percent.

16. The protective film of claim 1 wherein the protective film satisfies condition:

$$R_0 \leq 1/(-4.1 \times 10^{-4} Z^2 + b \times Z - 0.015)$$

wherein $R_0$ represents the absolute retardation in plane in no, Z represents the axis dislocation angle in degree of the protective film for a polarizing plate, b is a value selected from a group consisting of 0.038.

17. The protective film of claim 1 wherein number of glittering points having a diameter of at least 0.01 mm on the protective film is not more than 200/cm$^2$, which is counted by that two polarizing plates are arranged in cross Nicol, and the protective film is placed between them and one surface of the polarizing plates are irradiated with light.

18. A polarizing plate comprising a first protective film, a polarizer and a second protective film wherein at least one of the first protective film and the second protective film comprises cellulose ester having a value of weight average molecular weight Mw/number average molecular weight Mn of 3.0 to 5.0.

* * * * *